(12) United States Patent
Schulz et al.

(10) Patent No.: US 10,662,004 B1
(45) Date of Patent: May 26, 2020

(54) SINGLE SIDE TRUSS STACKER

(71) Applicants: Jared A. Schulz, Monett, MO (US); Jack A. Schulz, Monett, MO (US)

(72) Inventors: Jared A. Schulz, Monett, MO (US); Jack A. Schulz, Monett, MO (US)

(*) Notice: Subject to any disclaimer, the term of this patent is extended or adjusted under 35 U.S.C. 154(b) by 0 days.

(21) Appl. No.: 15/935,169

(22) Filed: Mar. 26, 2018

Related U.S. Application Data

(63) Continuation-in-part of application No. 15/729,785, filed on Oct. 11, 2017, now abandoned.

(60) Provisional application No. 62/407,100, filed on Oct. 12, 2016.

(51) Int. Cl.
*B65G 57/28* (2006.01)

(52) U.S. Cl.
CPC .......... *B65G 57/28* (2013.01); *B65G 2201/02* (2013.01)

(58) Field of Classification Search
CPC ............................. B65G 57/28; B65G 2201/02
USPC ................................................ 414/790, 792.8
See application file for complete search history.

(56) References Cited

U.S. PATENT DOCUMENTS

| | | | |
|---|---|---|---|
| 3,079,014 A * | 2/1963 | Fredriksson | B21B 39/002 271/189 |
| 3,437,216 A | 4/1969 | McGlinchey | B65G 57/08 |
| 3,517,834 A | 6/1970 | Adams | E04G 21/14 |
| 3,811,578 A | 5/1974 | Jureit et al. | B65G 57/28 |
| 3,876,097 A * | 4/1975 | Svenson | B65G 1/0407 414/137.1 |
| 3,984,010 A | 10/1976 | Woloveke et al. | B65G 57/00 |
| 5,468,118 A | 11/1995 | LePoire | B65G 57/035 |
| 5,683,222 A * | 11/1997 | Ingelhag | B65G 59/023 414/797.2 |
| 6,361,265 B1 * | 3/2002 | Mahoney | B65G 47/54 198/468.6 |
| 6,969,954 B2 * | 11/2005 | Lys | H04L 29/12254 315/152 |
| 2005/0281641 A1 * | 12/2005 | Maynard | B65G 1/1375 414/273 |
| 2010/0061829 A1 * | 3/2010 | McAdoo | B25J 5/04 414/222.02 |

OTHER PUBLICATIONS http://www.square1design.com/stackers.htm Accessed on Jun. 11, 2018.

* cited by examiner

*Primary Examiner* — Lynn E Schwenning
(74) *Attorney, Agent, or Firm* — Jonathan A. Bay

(57) ABSTRACT

A truss stacking system has a main conveyor for conveying trusses of a plurality of diverse designs out of a production facility and into a stack building yard or warehouse. The main conveyor is attended by a dedicated truss stacking station for each of the diverse designs, and which station includes a truss lift sub-station and a stack-forming sub-station. Each truss lift sub-station has at least a pair of traveling masts that each raises and lowers at least one bunk (eg., fork). The bunks are raised to lift a selected truss off the outflow conveyor, the masts are driven on an outbound journey to support the lifted bunk in the airspace above the stack-forming station, and then the bunks are lowered to rest the truss on the stack. Stop posts assist in stripping the truss off the bunks.

8 Claims, 21 Drawing Sheets

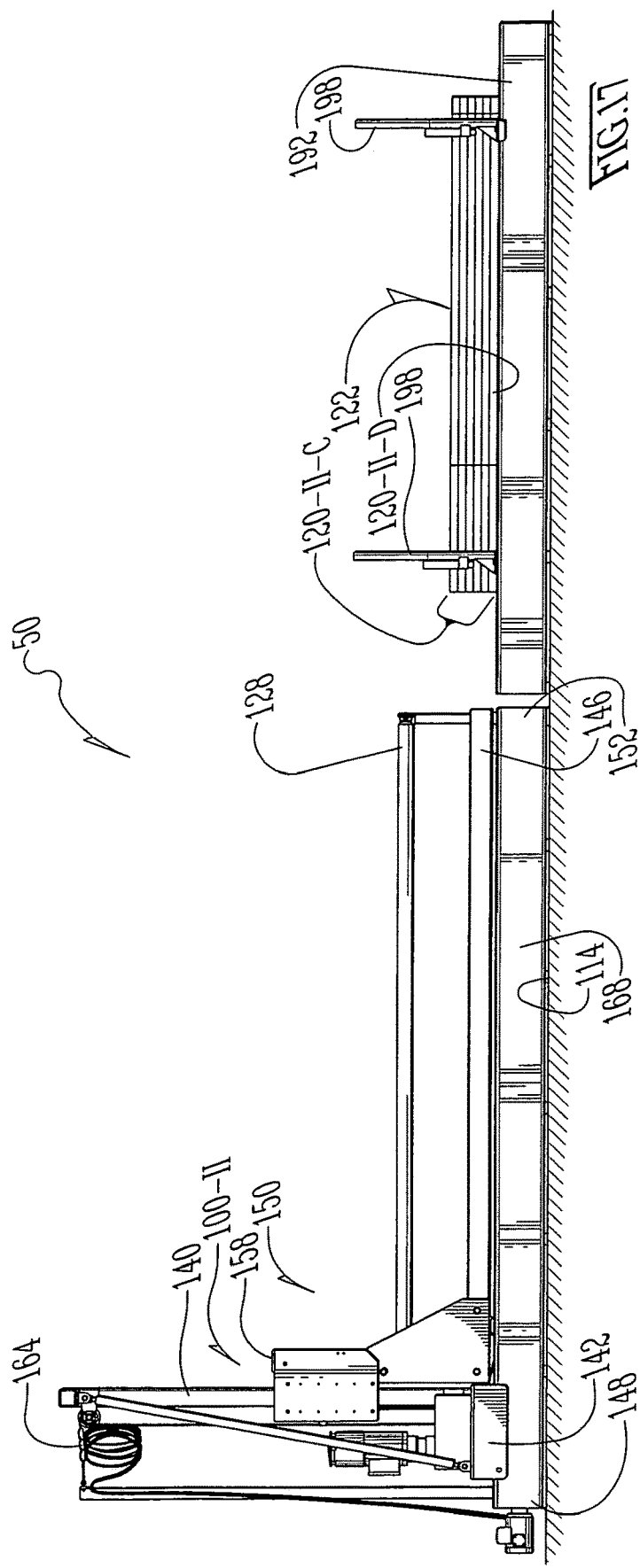

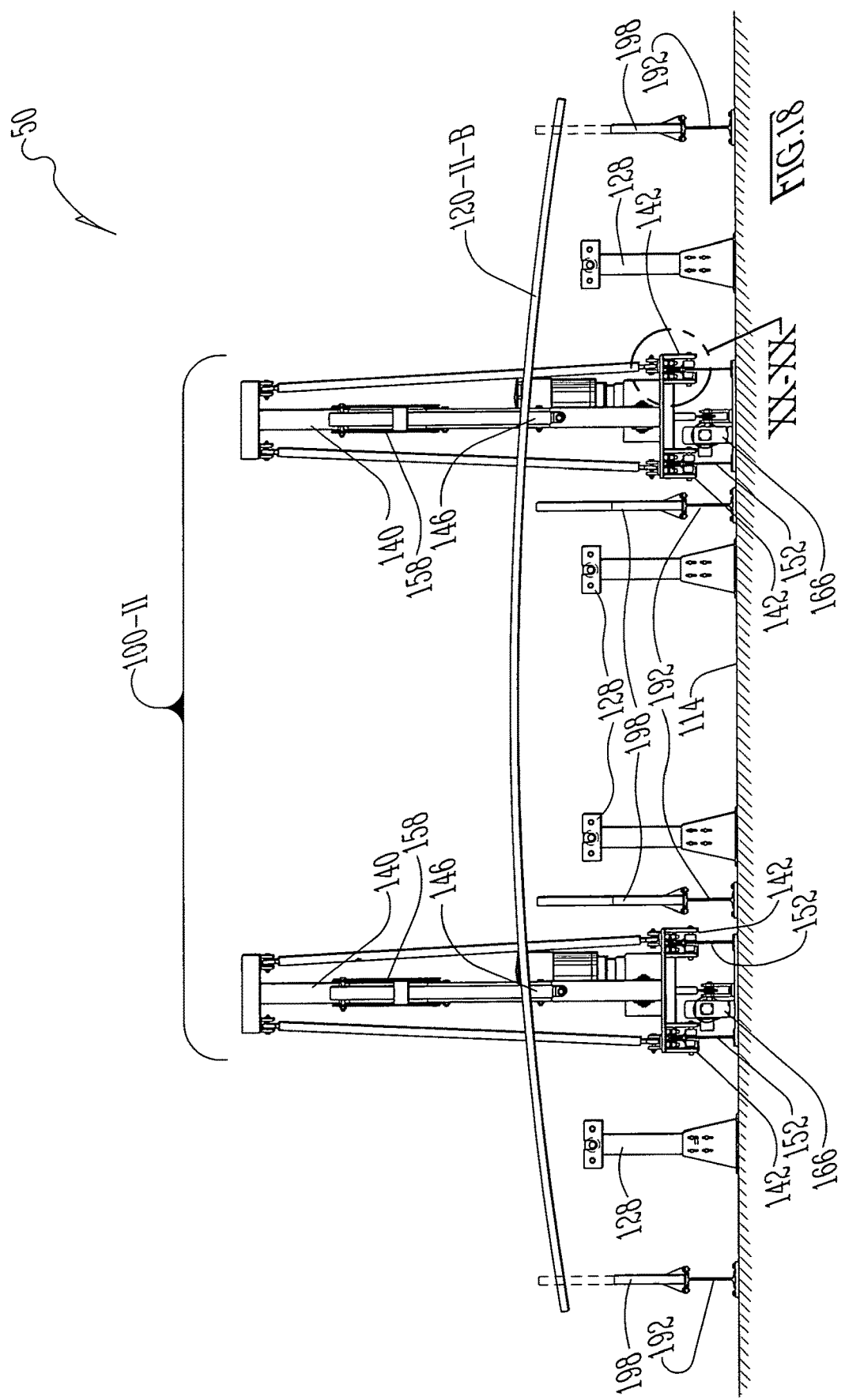

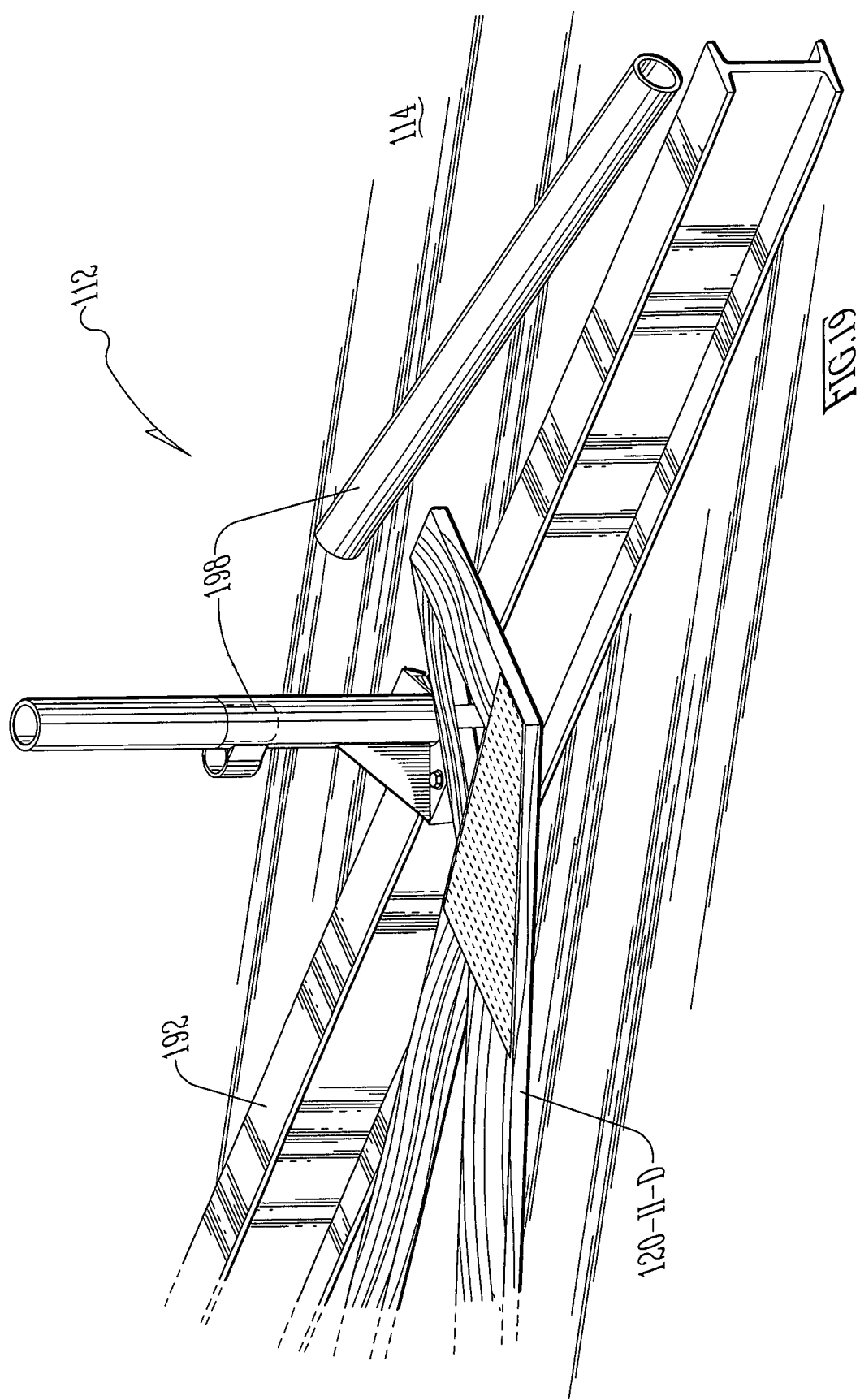

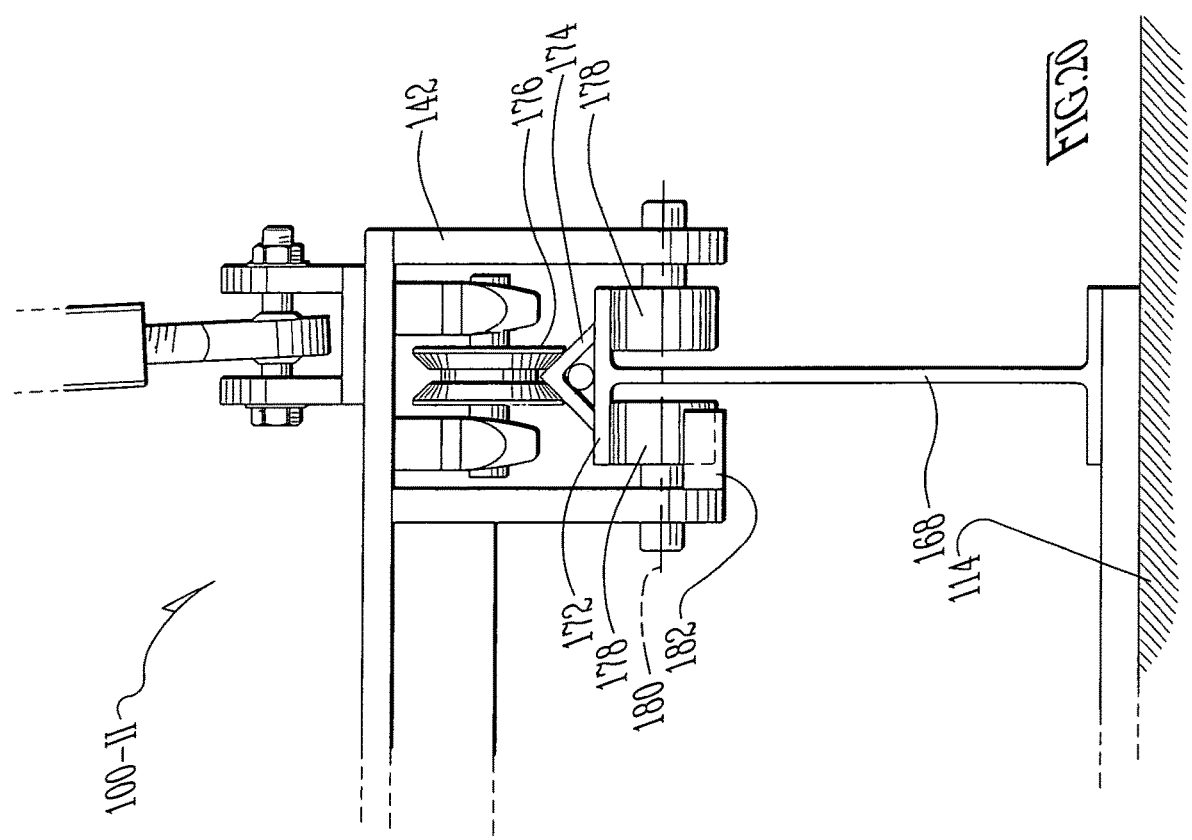

SINGLE SIDE TRUSS STACKER

CROSS-REFERENCE TO PROVISIONAL APPLICATION(S)

This application is a continuation-in-part of U.S. patent application Ser. No. 15/729,785, filed Oct. 11, 2017; which claims the benefit of U.S. Provisional Application No. 62/407,100, filed Oct. 12, 2016. The foregoing patent disclosure(s) is(are) incorporated herein by this reference thereto.

BACKGROUND AND SUMMARY OF THE INVENTION

The invention relates to article handling and, more particularly, to a truss stacker (or alternatively referred to also as, a truss stacking system).

It is an object of the invention to provide a single side truss stacker.

It is another object of the invention to provide a process line of plural single side truss stacking stations working to the side of (or straddling) a conveyor carrying an outflow of freshly made trusses from a truss making plant.

Single side truss stacking makes sense to conserve workspace in the work yard where the trusses are stacked. In a typical work yard, the land vehicles require much more real estate than the line of truss stacking stations. The land vehicles include the fork trucks that lift the stacks of trusses and the semi-tractors and flat bed trailers on which the fork trucks load the stack of truck from delivery away from the plant. Stacks of large trusses nowadays often require two, sometimes three, fork trucks working in concert. The amount of space required to make a 90° pivot, let alone a 180° pivot, is substantial.

So as a practical matter, it is impractical to stack on both sides of the process line because the real estate needs of the land vehicles is so great that the overall size of the work yard would be twice what a single side truss stacking line requires. In other words, the size of the work yard can literally be halved for a single side truss stacking line. The single side truss stacking line can be set up along a property line or the like where the work yard is landlocked, thereby maximizing the rest of the real estate that is available for the maneuvering of the large heavy land vehicles.

It is a further object of the invention to avoid hydraulics as well as scissor jacks. It is a corollary object of the invention that the power needs are met by electric power supply to electrodynamic appliances that power such drive trains utilizing any of gear, sprocket, spindle, chain, cable and so on:—but not hydraulics or scissor jacks.

It is a further object of the invention to configure the outflow conveyor as a series of generously spaced hurdles wherein the cross bar of which are rollers. Spacing which is generous is in the neighborhood of six feet (~2 m) and greater. However, less generous spacing will serve the purpose. In the preferred embodiment, every other roller is driven, and the alternate rollers are idlers. In any event, not every roller need be driven. This spacing between the rollers provides the advantage of allowing workers to comfortably walk between spaced rollers. Among other reasons for facilitating pedestrian traffic between rollers includes the following. If for any reason any of the truss lift sub-stations stops working or else is taken offline (as for maintenance or the like), workers can still work manually in teams to lift off trusses transiting on the outflow conveyor and carry the trusses sideways to the stack forming sub-station. And the conveyor will pose no impediment to the manual lift and carry operation.

Preferably the driven rollers all have their own independent drives. They should turn at more or less the same speed, but exact precision is not needed.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 17 is a side elevation comparable to FIG. 16 except showing that the stack now comprises several trusses stacked horizontally on top of each other, wherein FIG. 7 shows better the detector that is mounted in a plane below the bunks that senses the elevation of the top of the stack such that the masts do not drive the bunks into the top of the stack when lowering the current lifted truss onto the top of the stack, and wherein preferably this detector comprises a laser device and the beam axis therefor is indicated in dashed lines;

FIG. 18 is a side elevation view taken in the direction of arrows XVIII-XVIII in FIG. 3;

FIG. 19 is an enlarged-scale perspective view of detail XIX-XIX indicated in FIG. 3; and FIG. 20 is an enlarged-scale side elevation view of detail XX-XX indicated in FIG. 19.

DETAILED DESCRIPTION OF THE PREFERRED EMBODIMENTS

Figure 1:
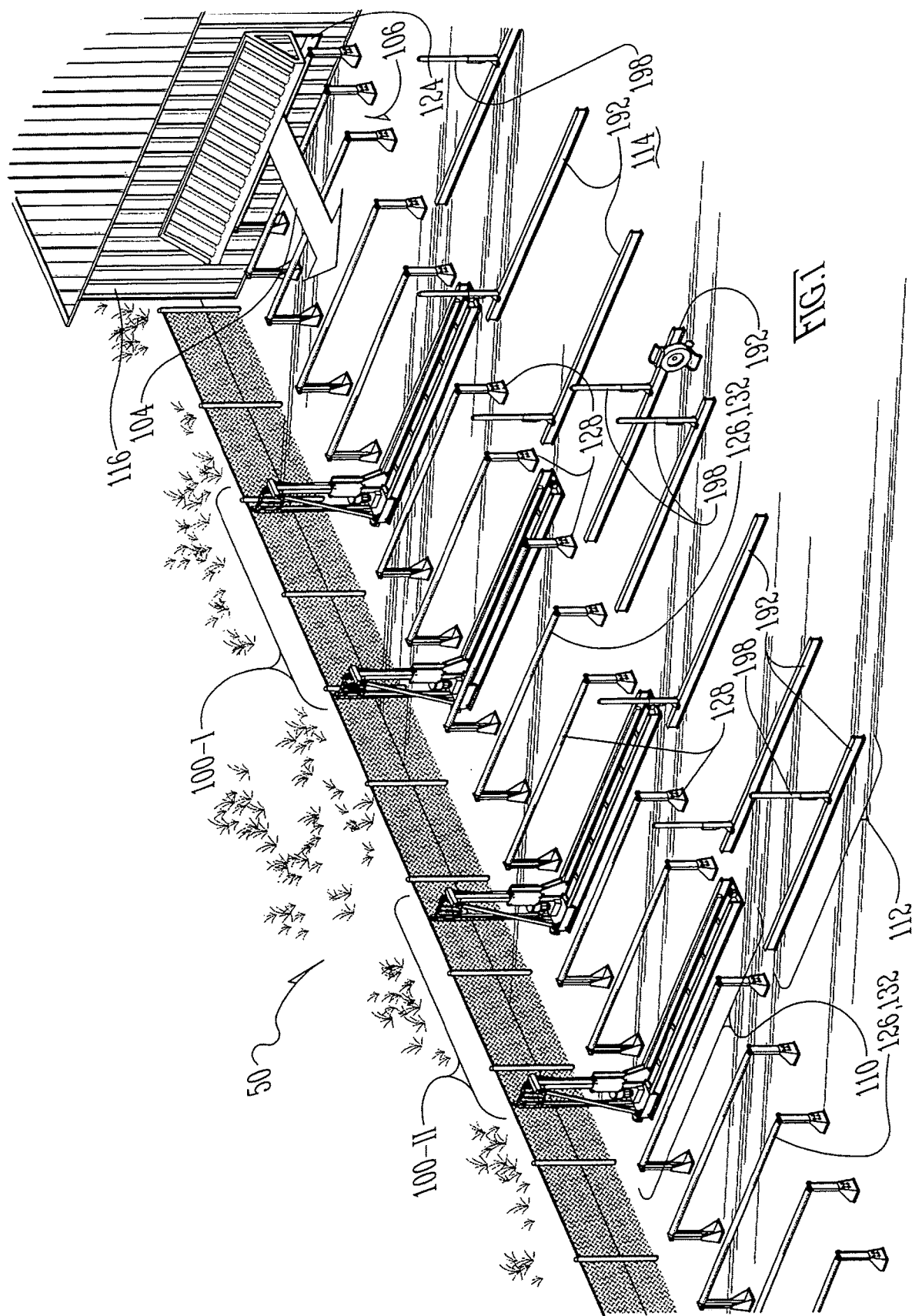
FIG. 1 is a perspective view of a truss stacking system in accordance with the invention, wherein at least two truss stacking stations are in view, each comprising a truss lift sub-station and a stack forming sub-station.
Figure 2:
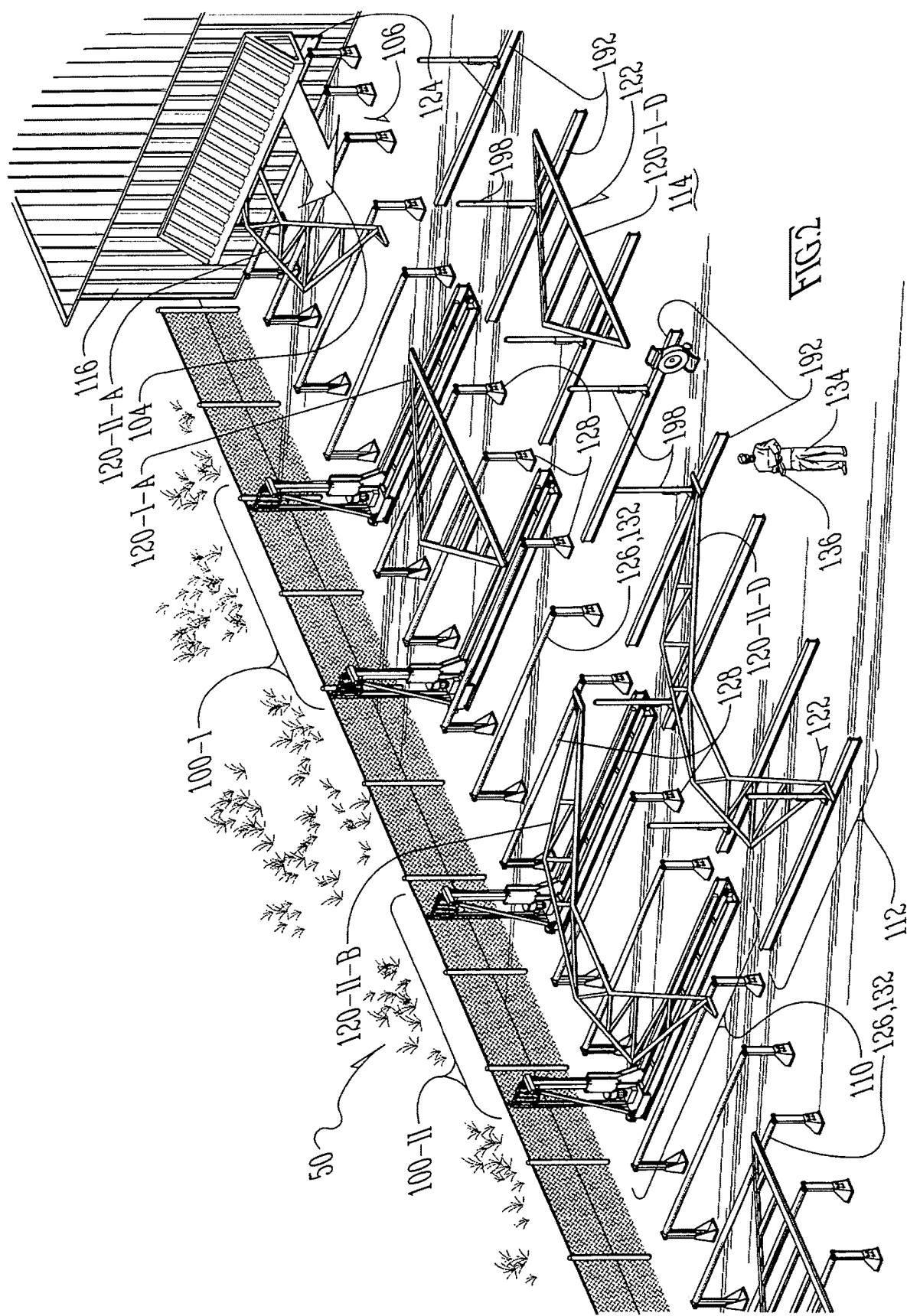
FIG. 2 is a perspective view comparable to FIG. 1 except showing a supply of freshly-made trusses exiting a window from a truss-making plant and transiting along an outflow conveyor, comprising a roller conveyor bed.
Figure 17A:
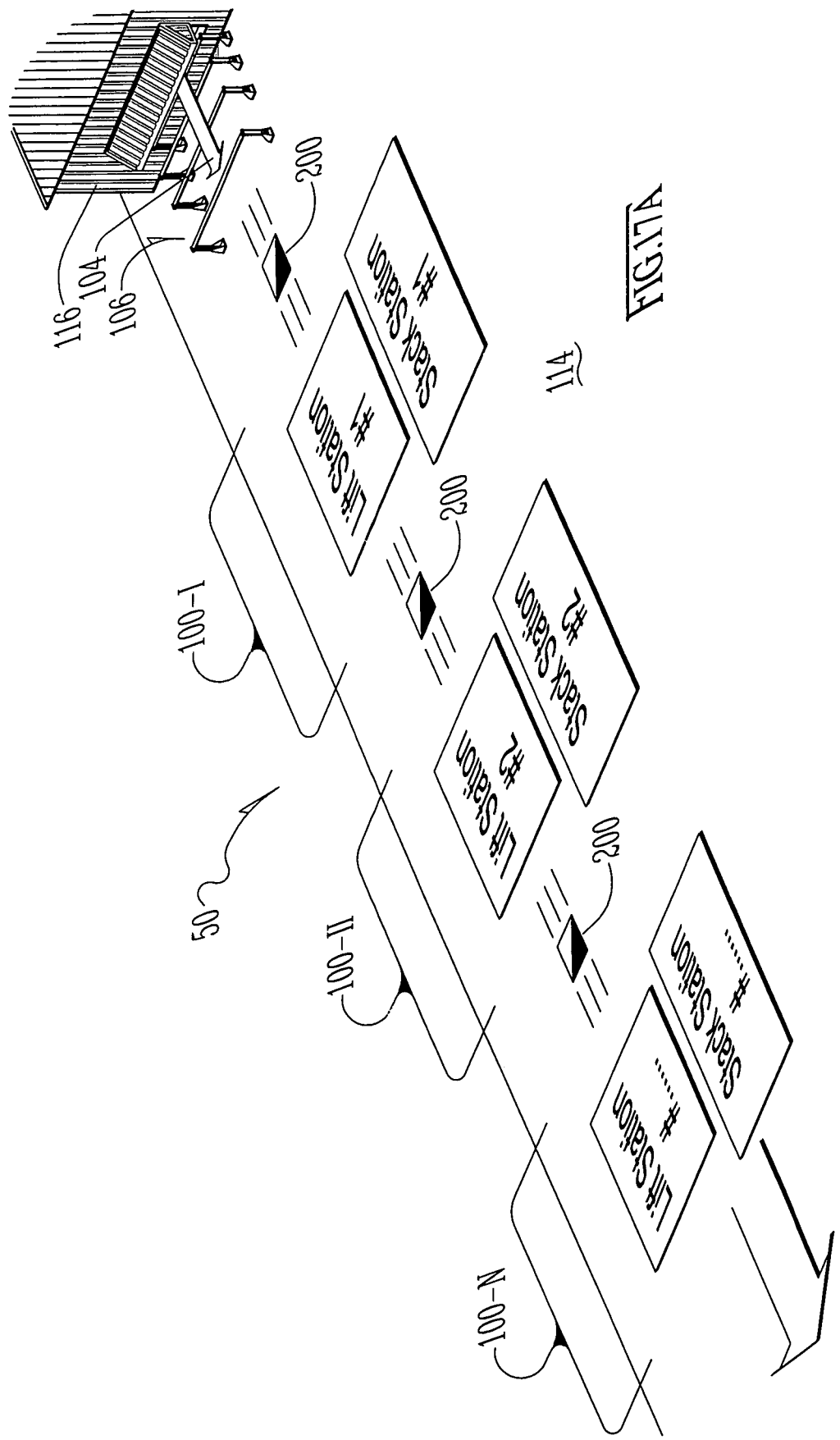
FIG. 17A is block diagram perspective view of the truss stacking system in accordance with the invention showing that the work yard comprises an indefinite number of sets of lift and stack forming sub-stations, wherein each set of lift and stack forming sub-stations might not just be a pair but might comprise three or more masts and not just two as illustrated, and wherein each truss stacking station is associated with a detector, preferably comprising an identifying and motion detecting function for both 'identifying' if the given truss is to be lifted by the respective truss lift sub-station and, if so, then also 'timing' when to lift the truss as it travels along.

FIGS. 1, 2 and 17A show a truss stacking system 50 in accordance with the invention. The truss stacking system 50 comprises between one and a plurality of truss stacking stations 100-I, 100-II . . . 100-N in accordance with the invention, preferably a plurality, arranged in a process line 104 determined by an outflow conveyor 106. Each truss stacking station 100-I, 100-II . . . 100-N comprises a truss lift sub-station 110 and a respective stack forming sub-station 112.

The drawings show the outflow conveyor 106 to comprise a roller conveyor bed 106 permanently installed (ie., more or less permanently) in a work yard 114 adjacent to a truss-making plant 116. Typically freshly made trusses 120-I-A, 120-II-A and so on (eg., trusses of a Type I style, and a Type II style and so on) transit out of the truss-making plant 116 on the roller conveyor bed 106 (eg, wherein riding on the roller conveyor bed 106 corresponds to State A for the trusses 120, in contrast to State B which corresponds to the steps of being lifted and stacked in a stack 122, and State C which corresponds to resting in a stack 122, except State D corresponds to being the bottommost truss in a stack 122).

The trusses 120-I-A, 120-II-A and so on are typically roof trusses or floor trusses. The work yard 114 is typically outdoors relative to the indoor truss-making plant 116. But the work yard 114 can optionally be covered and still be outdoors, or fully enclosed and thus have its own indoor environment. However, being outdoors and uncovered is more typical.

FIGS. 1, 2 and 17A show that the truss-making plant 116 has an exterior wall formed with an opening 124 (eg., an open window 124) that can be covered by a flap. FIG. 2 shows that freshly made trusses 120-I-A, 120-II-A are conveyed from within inside the truss-making plant 116 to transit through the opening 124 therefore and to be continued to be conveyed on the roller conveyor bed 106 therefor.

Hence the roller conveyor bed 106 carries away the outflow of freshly built wooden trusses 120-I-A, 120-II-A from the truss-making plant 106. Indeed, at any given moment, a plurality of such freshly made wooden trusses 120-I-A, 120-II-A are being propelled along over the tops of the roller conveyor bed 106.

The roller conveyor bed 106 comprises a series of generously spaced hurdles 126 wherein the cross bars of which are rollers 128,132. Spacing which is generous is in the neighborhood of six feet (~2 m) and greater. However, less generous spacing will serve the purpose. In the preferred embodiment, every other roller 128 is driven, and the alternate rollers 132 are idlers. In any event, not every roller 128,132 need be driven. This spacing between the rollers 128,132 provides the advantage of allowing workers 134 to comfortably walk between spaced rollers 128,132. Among other reasons for facilitating pedestrian traffic between rollers 128,132 includes the following. If for any reason any of the truss lift sub-stations 110 stop working or else are taken offline (as for maintenance or the like), workers 134 can still work manually in teams to lift off trusses 120-I-A, 120-II-A transiting on the outflow conveyor 106 and carry the trusses 120-I-A, 120-II-A sideways to the respective stack forming sub-station 112. And the conveyor 106 will pose no impediment to the manual lift and carry operation.

Preferably the driven rollers 128 all have their own independent drives 138. They should turn at more or less the same speed, but exact precision is not needed. The drawings show that each hurdle 126 of a driven roller 128 has an electric drive motor 138 mounted thereto.

Ultimately the roller conveyor bed 106 transports the freshly made trusses 120-I-A, 120-II-A past one or more truss stacking stations 100-I, 100-II . . . 100-N in accordance with the invention.

FIG. 2 shows trusses 120-I-A, 120-II-A being transported along the roller conveyor bed 106 and taken out of the factory's exit window 124 therefor.

Figure 3:
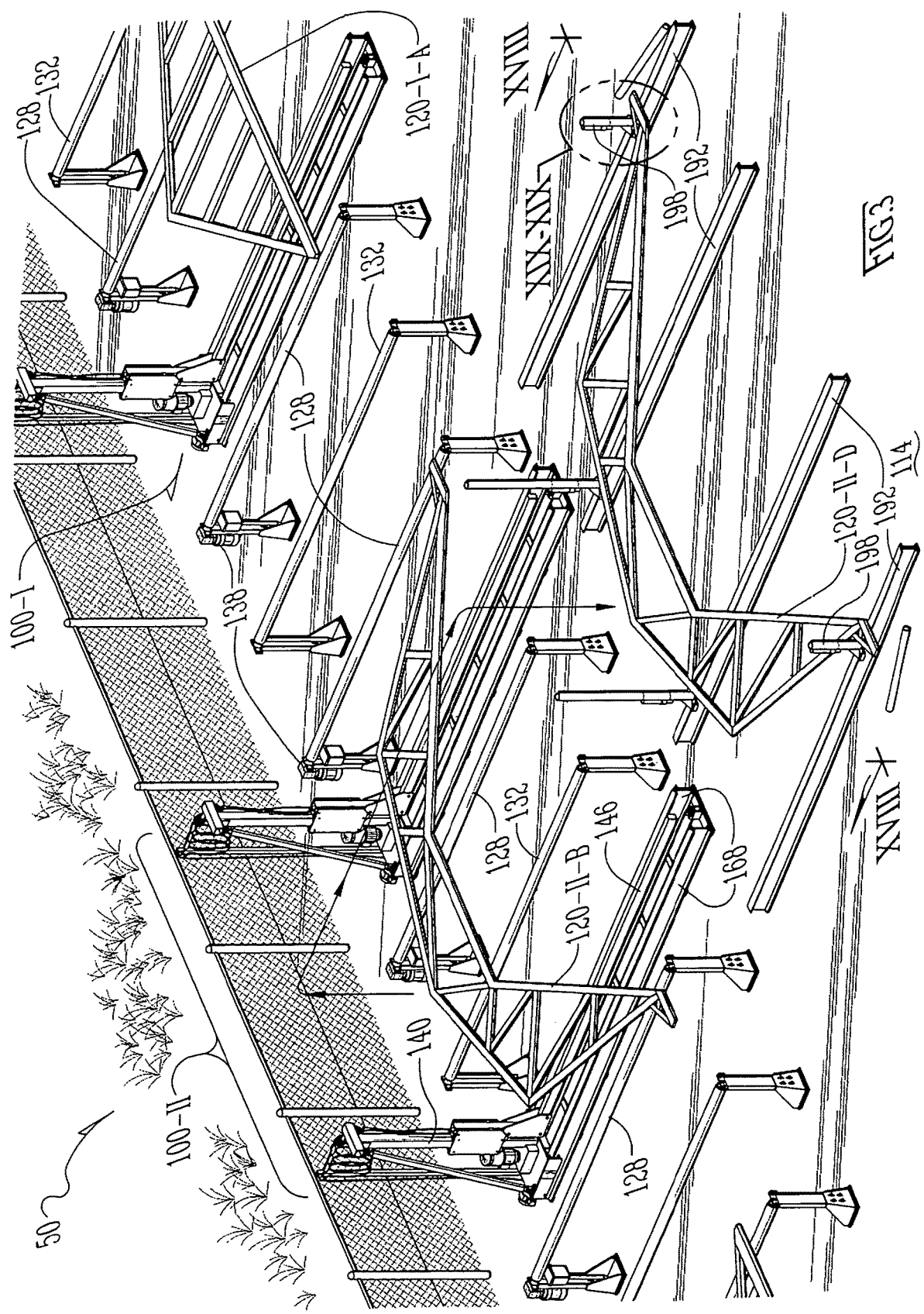
FIG. 3 is an enlarged-scale perspective view comparable to FIG. 2 except showing on an enlarged-scale a single truss stacking station from FIG. 2.
Figure 4:
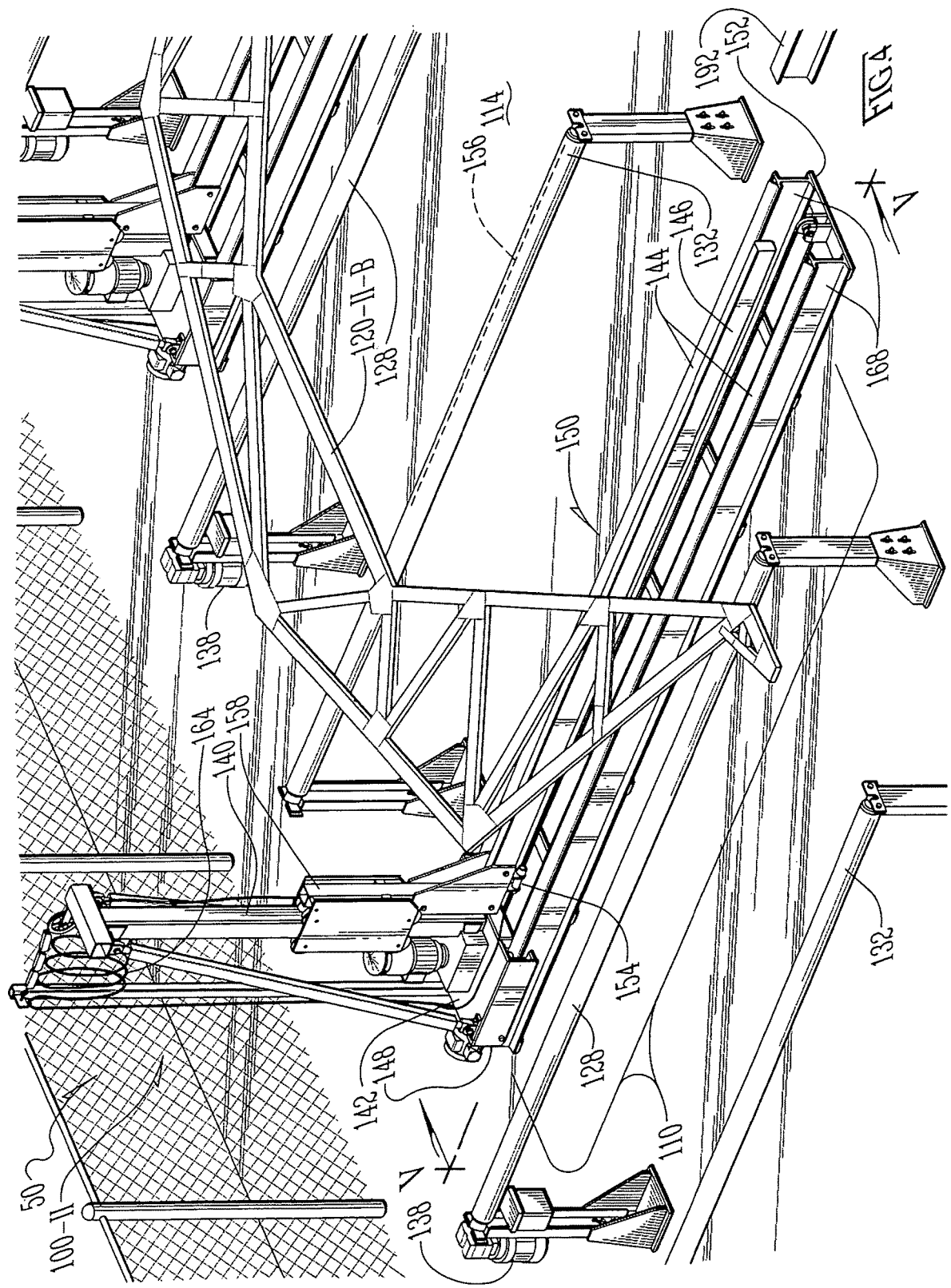
FIG. 4 is an enlarged-scale perspective view comparable to FIG. 3 except further showing on an even furthermore enlarged-scale the downline mast of the truss-lifting half of the single truss stacking station in FIG. 3.

FIGS. 3 and 4 zoom in on the second downline truss stacking station 100-II shown in FIGS. 1 and 2. It comprises a pair of masts 140 carried by respective carriages 142 that ride over respective rail and track systems 144 therefor. Each mast 140 elevates and lowers its own respective bunk 146 (eg., fork). The truss stacking station 100-I, 100-II . . . 100-N might comprise three or four masts 140, depending on the size of the trusses 120-I-A, 120-II-A to be stacked.

In FIGS. 1-5, the masts 140 and carriages 142 and bunks 146 are shown in a 'home' position 150. Hence, for orientation of directions side to side, the masts 140 and carriages 142 as shown in these views are parked along the 'home' side 148 of the roller conveyor bed 106. The opposite side of the roller conveyor bed 106 is the 'stack forming' side 152. Hence the "home" position 150 is where the mast 140 and carriage 142 are parked along the home side 148 of the roller conveyor bed 106, and bunk 146 is in a lowered position (at least below the conveyance plane 156 of the roller conveyor bed 106). The "home" position 150 is detected by lasers, optics, limiter switches or the like (eg., see 200 in FIG. 17A).

Figure 6:
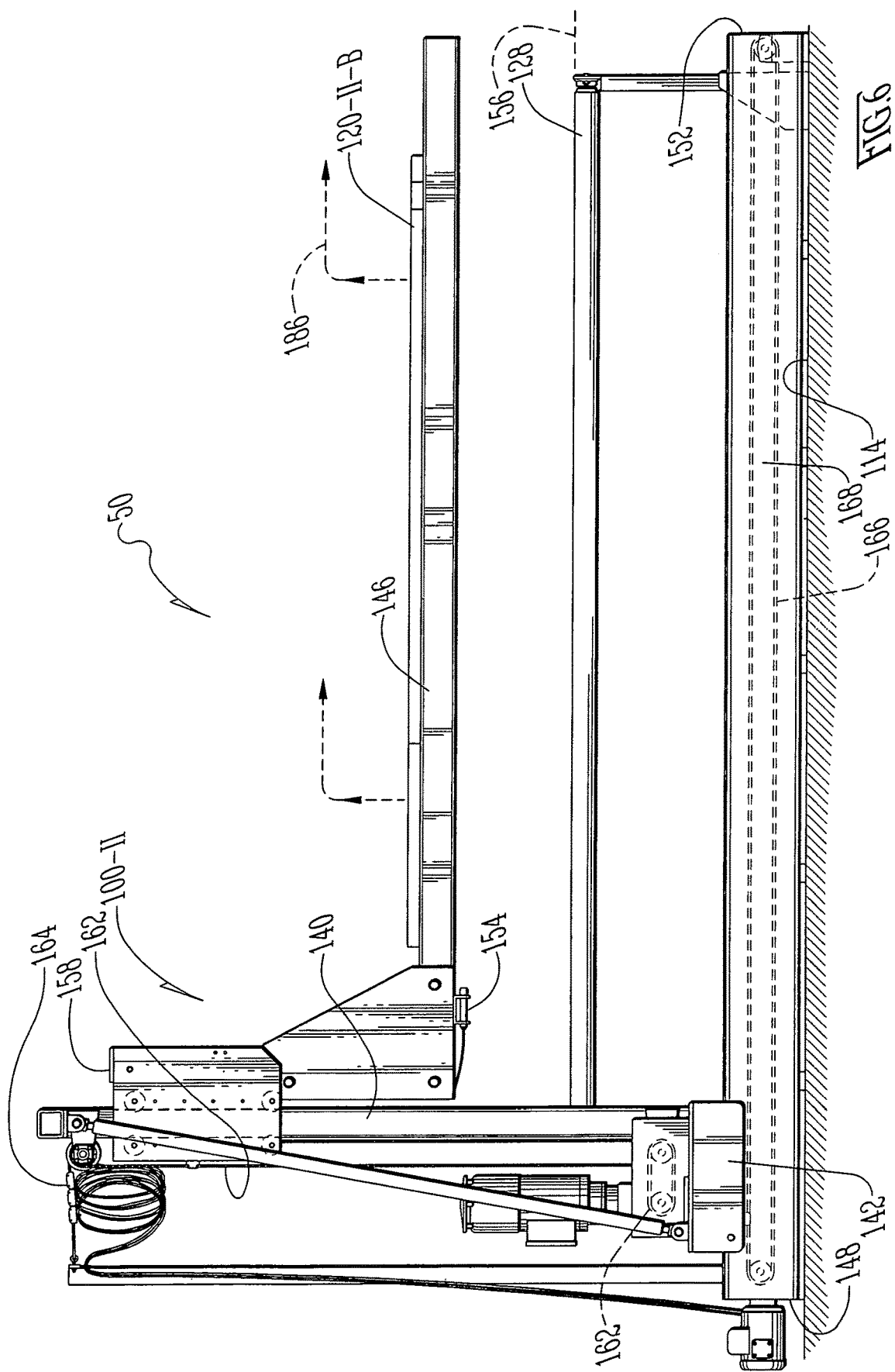
FIG. 6 is a side elevation view comparable to FIG. 5 except showing the masts lifting the bunks (eg., forks) and hence a truss to an elevated position (wherein only the mast and bunk in the foreground of FIG. 6 are discernible)

FIG. 6 shows that the masts 140 (only foreground mast 140 in view) have elevated the bunks 146 which in turn have lifted a given truss 120-II-B above the plane 156 of the roller conveyor bed 106. The timing of the lift is timed by detectors 200 better shown in FIG. 17A. The rollers 128,132 of the roller conveyor bed 106 keep rolling and do not stop. It is the elevating of the bunks 146 underneath the selected truss 120-II-B that lifts the truss 120-II-B off the roller conveyor bed 106, and hence suspends further downline travel.

Figure 7:
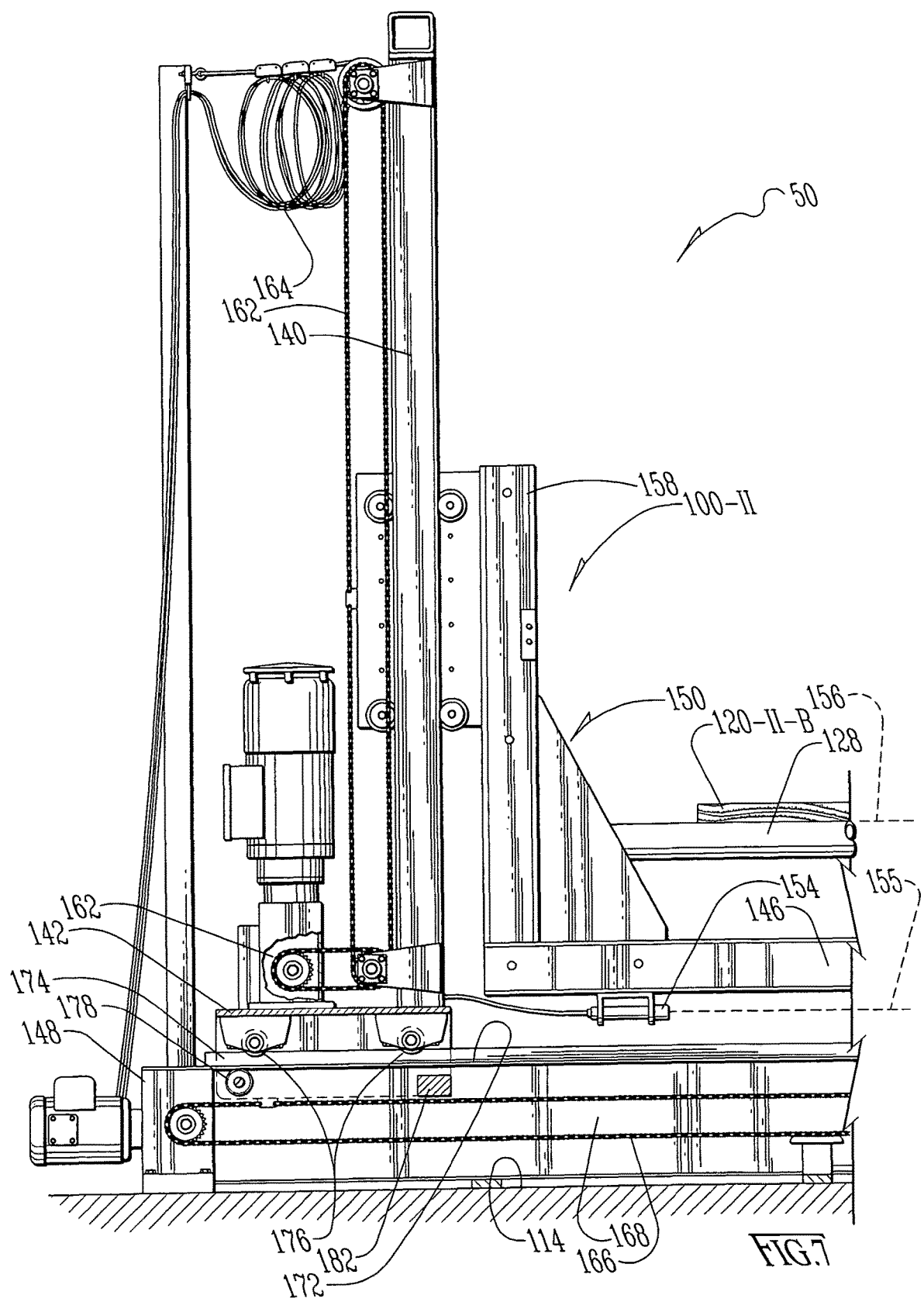
FIG. 7 is an enlarged-scale side elevation view of detail VII-VII indicated in FIG. 5.

FIG. 7 shows:—
a mast 140,
a horizontally-traveling carriage 142 for carrying the mast 140,
portions of a bunk 146,
a vertically-traveling bracket 158 mounted on the mast 140 and cantilevering the bunk 146,
an electric-motor driven chain drive system 162 for elevating and lowering the bracket 158 and bunk 146 thereof,
festooned electric conductors 164 for supplying the electric-motor driven chain drive system 162 for elevating and lowering the bracket 158 and bunk 146 thereof,
a horizontal rail and track system 144 for the carriage 142 to travel to and fro across,
an electric-motor driven chain drive system 166 for driving the carriage 142 on an outbound and inbound trips back and forth from the home side 148 to the far side of the stack forming side 152,
an I-beam 168 anchored on the ground and extending left and right under the plane 156 of the roller conveyor bed 106 from the home side 148 to the stack forming side 152,
the I-beam 168 having an upper pair of flanges 172 (only the downline flange 172 is in view),
an inverted-V shaped, sharp-crested rail 174 mounted on top of the upper pair of flanges 172 of the I-beam 168 (see also FIG. 20),
a pair of left and right V-grooved rail-riding wheels 176 (left and right given the orientation of the view) for riding on the inverted-V shaped, sharp-crested rail 174 (see also FIG. 20),
a left-side only pair of front and back cam-rollers 178 for rolling against the undersurface of the upper flanges 172 of the I-beam 168 (left given the orientation of the view, and 'front' or downline roller in view since they are mounted on a common upline-downline axis 180) (see also FIGS. 20, and 17A),
right-side only chin strap 182 stopping against the undersurface of the upper flange(s) 172 of the I-beam 168 in the unwanted circumstance that the mast 140 would be tipped counterclockwise in the view (wherein the mast 140 should never experience a counterclockwise tip over event, since all the applied vertical loads are always along a vector somewhere in the middle of the bunk 146, and which thereby justifies why only a left-side pair of cam rollers 178 are utilized:—right-side cam rollers 178 would be non-involved) (again, orientations are relative the vantage point of the view) (see also FIG. 20), and
a detector 154 that is mounted in a plane below the bunk 146 that senses the elevation of the top of the stack 122 such that the mast 140 does not drive the bunk 146 down into the top of the stack 122 when lowering the currently lifted truss 120-II-b onto the top of the stack 122, and wherein preferably this detector 154 comprises a laser device 154 and the beam axis 156 therefor is indicated in dashed lines.

Aspects mentioned above concerning the horizontal rail and track system 144, the I-beam 168, the upper flanges 172 thereof, the inverted-V shaped, sharp-crested rail 174, a representative one of the pair of the V-grooved rail-riding wheels 176, the pair of cam-rollers 178, and the chin strap 182 are shown better in FIG. 20.

FIGS. 8-12 and then 14-16 show basically that the mast 140 and bunk 146 have a travel circuit that is characterized by the following positions and/or movements:—
a home position 150 (mast 140 retracted to the home side 148 of the roller conveyor bed 106, bunk 146 at an elevation below the plane 156 of the roller conveyor bed 106);
a bunk 146 elevating movement 186 lifting a selected truss 120-II-A off the roller conveyor bed 106);
an outbound transit movement 188 where the mast 140 travels from the home side 148 of the roller conveyor bed 106 to the stack-forming side 152 and where the bunk 146 (in cooperation with one or more other bunks 146) suspends the selected truss 120-II-b in the airspace above the stack 122 (or at least above ground stand-offs 192 on which the first truss 120-II-D is directly deposited upon);
a lowering movement 194 for the bunks 146 wherein the selected truss 120-II-B is deposited on top of the stack 122 (or to be the first truss 120-II-D of the stack 122); and then
a return to home position 150 movement 196 for both the mast 140 and bunk 146, albeit the mast 140 and bunk are driven separately by their respective drive systems 166 and 162.

To go all the way back to FIG. 2, it shows a worker 134 carrying a remote control unit 136. He now has control for the length of time for this pause. When the mast 140 and bunk 146 have moved the selected truss 120-II-B to the position of FIG. 11, preferably there is a pause in the movements of both the mast(s) 140 and bunk(s) 146. This gives the worker 134 the opportunity to walk around and under the truss 120-II-B to see if the nail plates have been set adequately, and/or do other inspections. When satisfied, with his or her remote control unit 136, he or she would enter a signal from the remote control unit 136 for the mast 140 and bunk 146 to complete the deposit of the truss 120-II-B on the stack 122. After that, and given the situation of things in FIG. 2, he or she can now inspect the recently-stacked truss 120-II-D (or 120-II-C) from above. Hence the worker 134 gives him or herself the opportunity to inspect each truss 120 from above and below.

So again, FIGS. 1-3 show at least two truss stacking stations 100-I, 100-II in accordance with the invention, wherein each comprises a truss lift sub-station 110 and a stack forming sub-station 112. The outflow conveyor 106 catches and carries a supply of freshly-made trusses 120-I-A, 120-II-A exiting a window 124 from a truss-making plant 116. FIG. 4 shows a selected truss 120-II-A arriving at the respective truss stacking station 100-II suited for it. FIG. 6 shows the masts 140 lifting the bunks 146 (eg., forks) and hence the selected truss 120-II-B to an elevated position (in all the side elevation views that follow, only the mast 140 and bunk 146 in the foreground are discernible).

Figure 5:
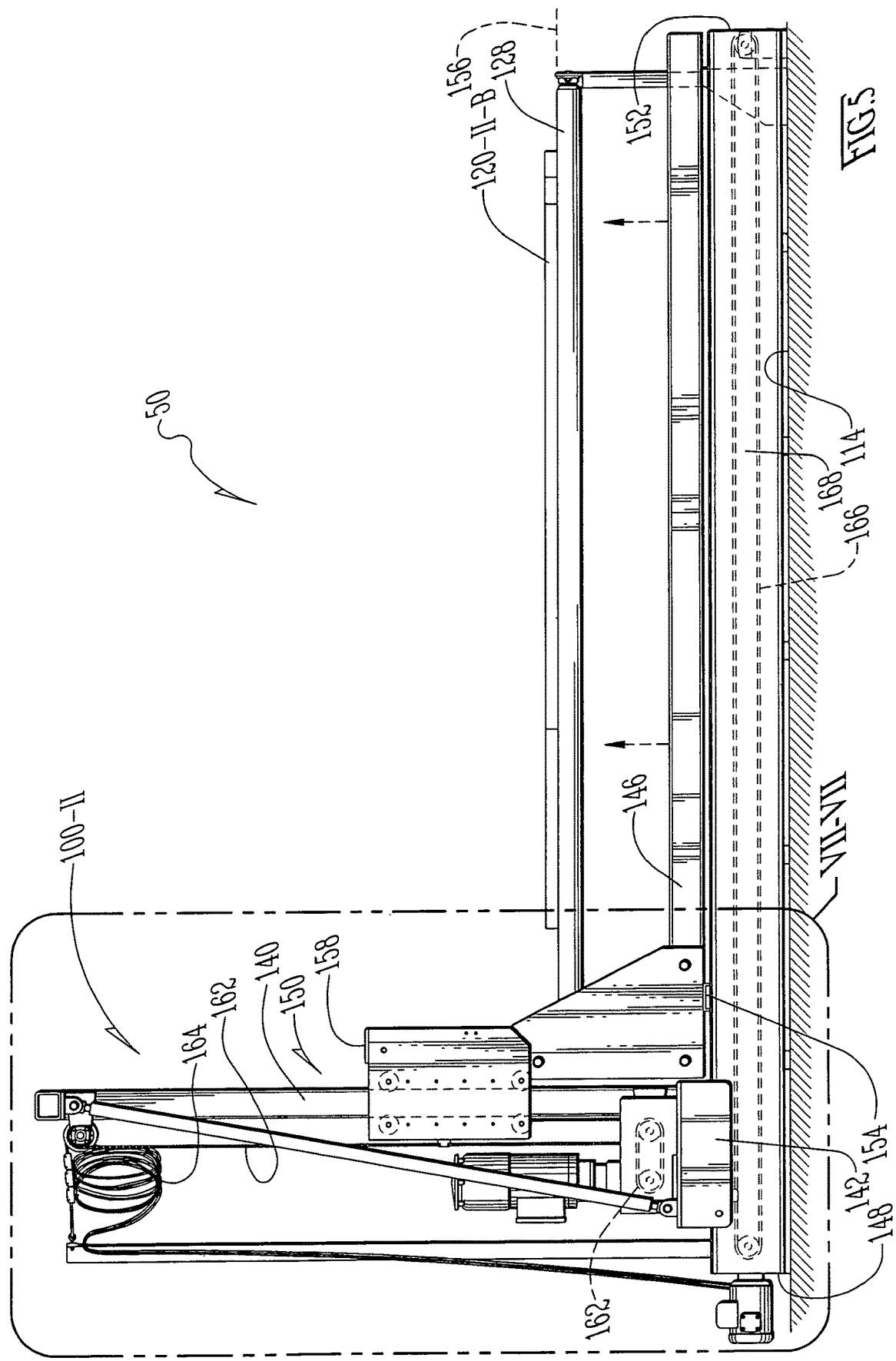
FIG. 5 is an enlarged-scale side elevation view taken in the direction of arrows V-V in FIG. 4.
Figure 8:
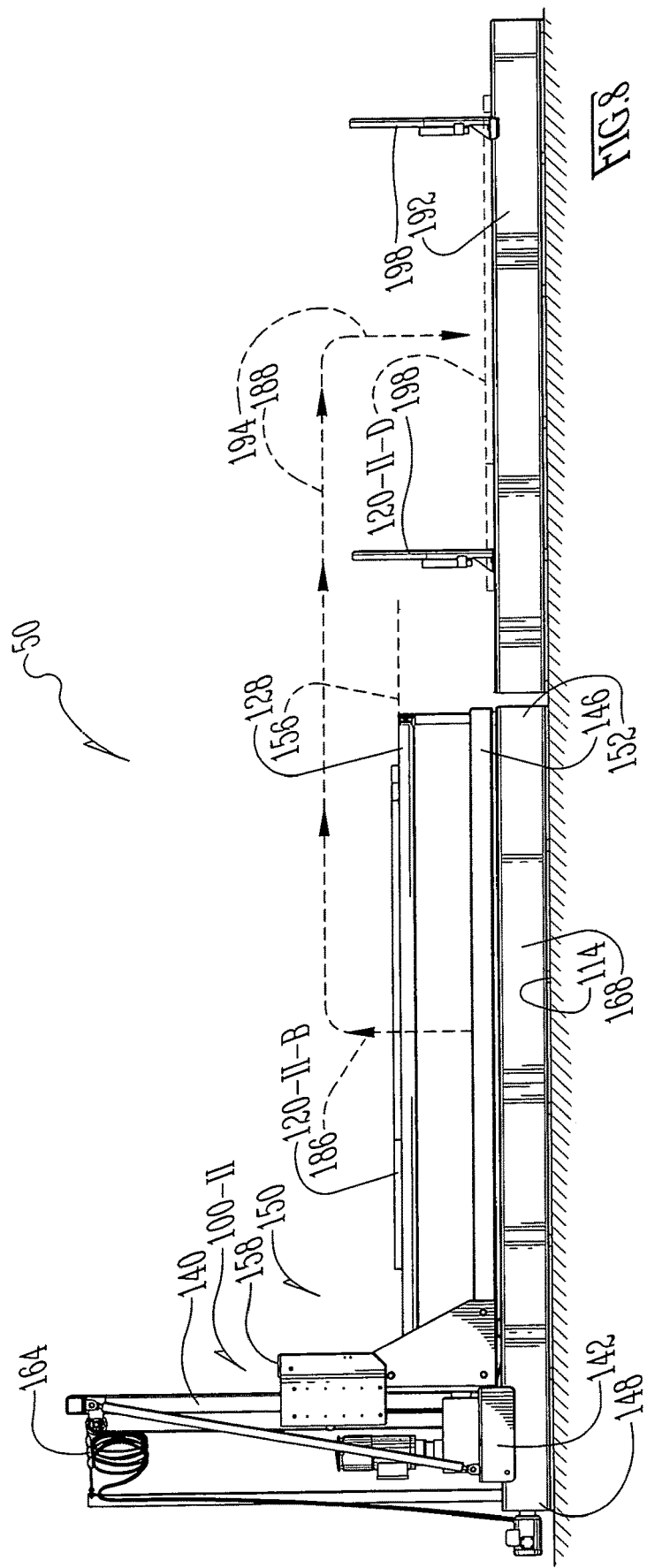
FIG. 8 is a reduced-scale side elevation comparable to FIG. 5 except showing the sideways trajectory of a truss in dashed-line arrows from being lifted off the roller conveyor bed to being deposited at the stack forming sub-station characterized by a plurality of ground stand-offs (eg., comprising for example and without limitation parallel rows of I-beams as shown better in FIG. 3 or 19)
Figure 9:
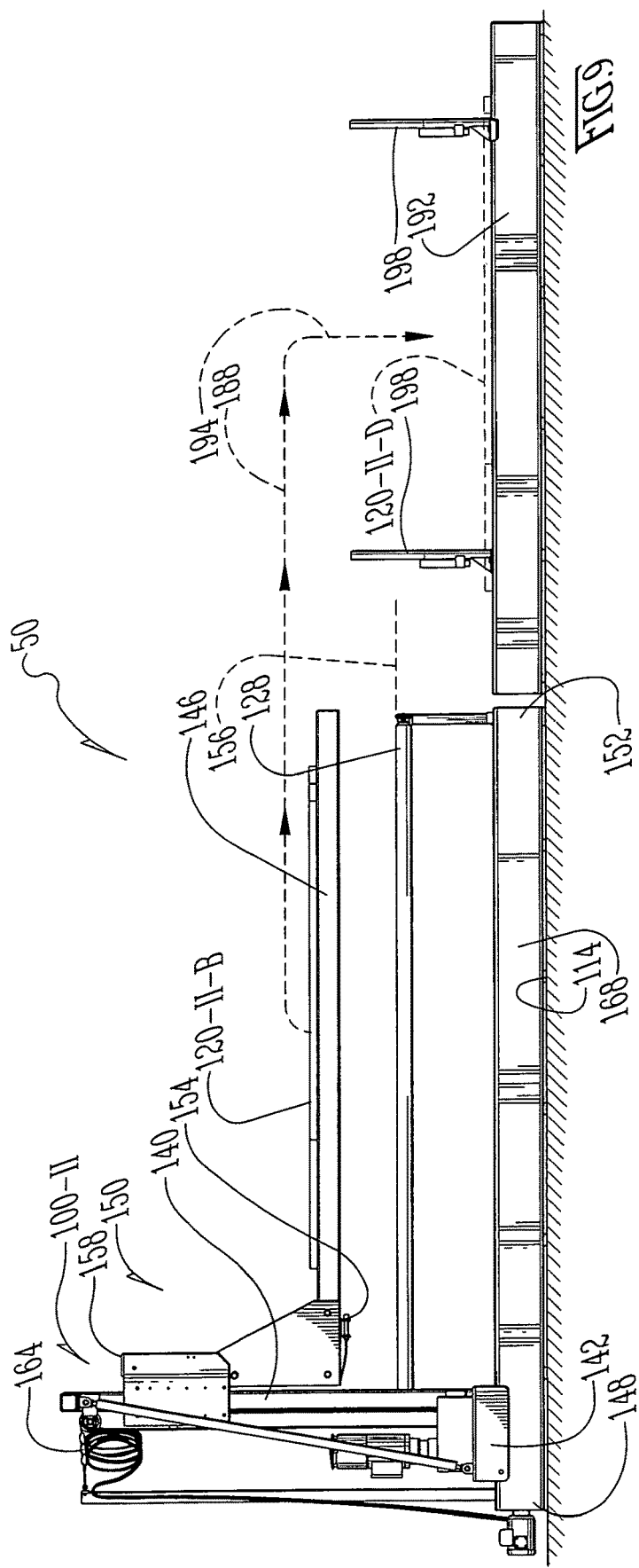
FIG. 9 is a side elevation comparable to FIG. 8 except showing a truss in solid lines lifted above the plane of the roller conveyor bed, and held aloft in the airspace above the roller conveyor bed, by the respective bunks (eg., forks) of the pair of masts of this truss stacking station (as shown in perspective in FIG. 4) (wherein only the mast and bunk in the foreground of FIG. 9 are discernible)

FIG. 8 shows things as they were in FIG. 5 but is illustrated on a reduced-scale size to further show the stack-forming sub-station 112. FIG. 9 shows things as they were in FIG. 6 but is illustrated on a reduced-scale size to further show the stack-forming sub-station 112. In both FIGS. 8 and 9, the trajectory of the truss 120-II-B is shown in dashed-line arrows from being lifted off the roller conveyor bed 106 to being deposited at the stack forming sub-station 112 characterized by a plurality of ground stand-offs 192. (eg., comprising for example and without limitation parallel rows of I-beams as shown better in FIG. 3 or 19). So FIG. 9 shows the selected truss 120-II-B in solid lines and lifted above the plane 156 of the roller conveyor bed 106, and held aloft in the airspace above the roller conveyor bed 106, by the respective bunks 146.

Figure 10:
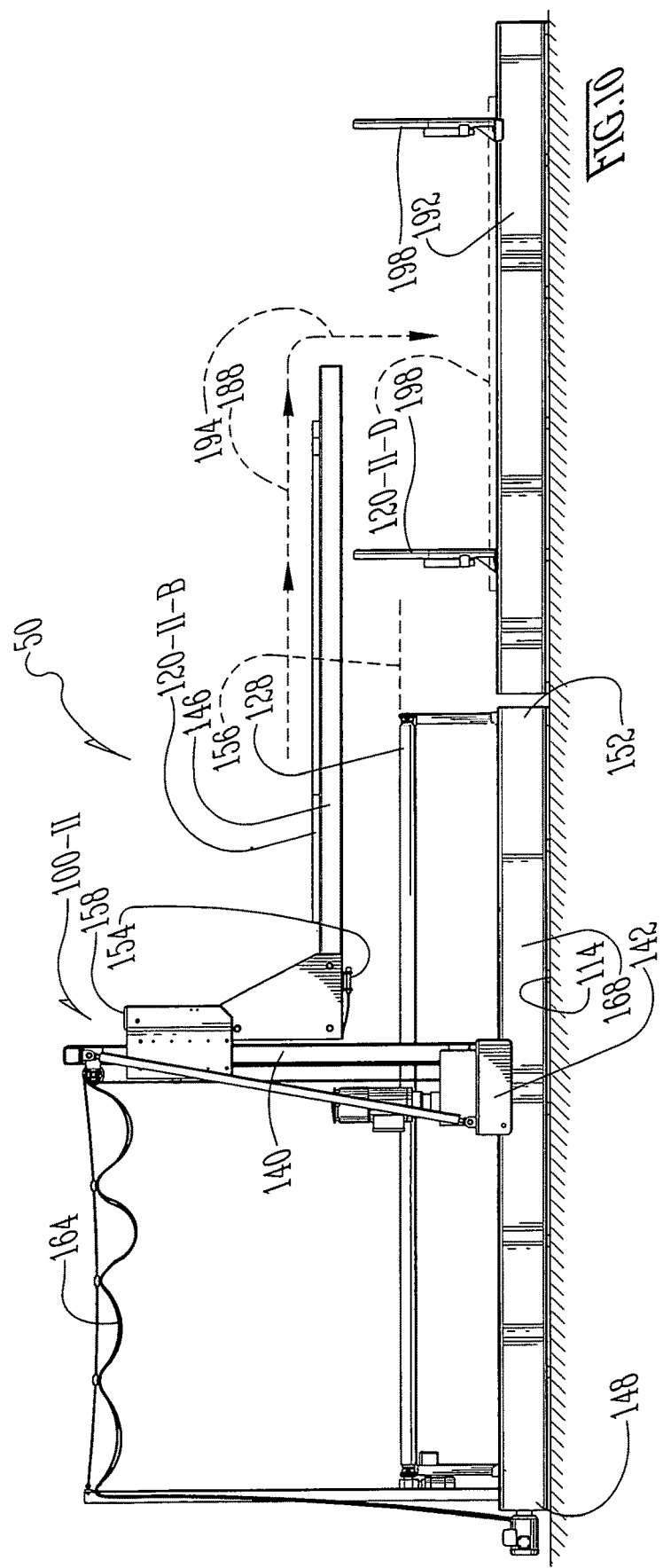
FIG. 10 is a side elevation comparable to FIG. 9 except showing the pair of masts (only the mast in the foreground of FIG. 10 is discernible) traveling across a rail and track system therefor to transport the lifted truss to an elevated position over the ground stand-offs of the stack forming sub-station.
Figure 11:
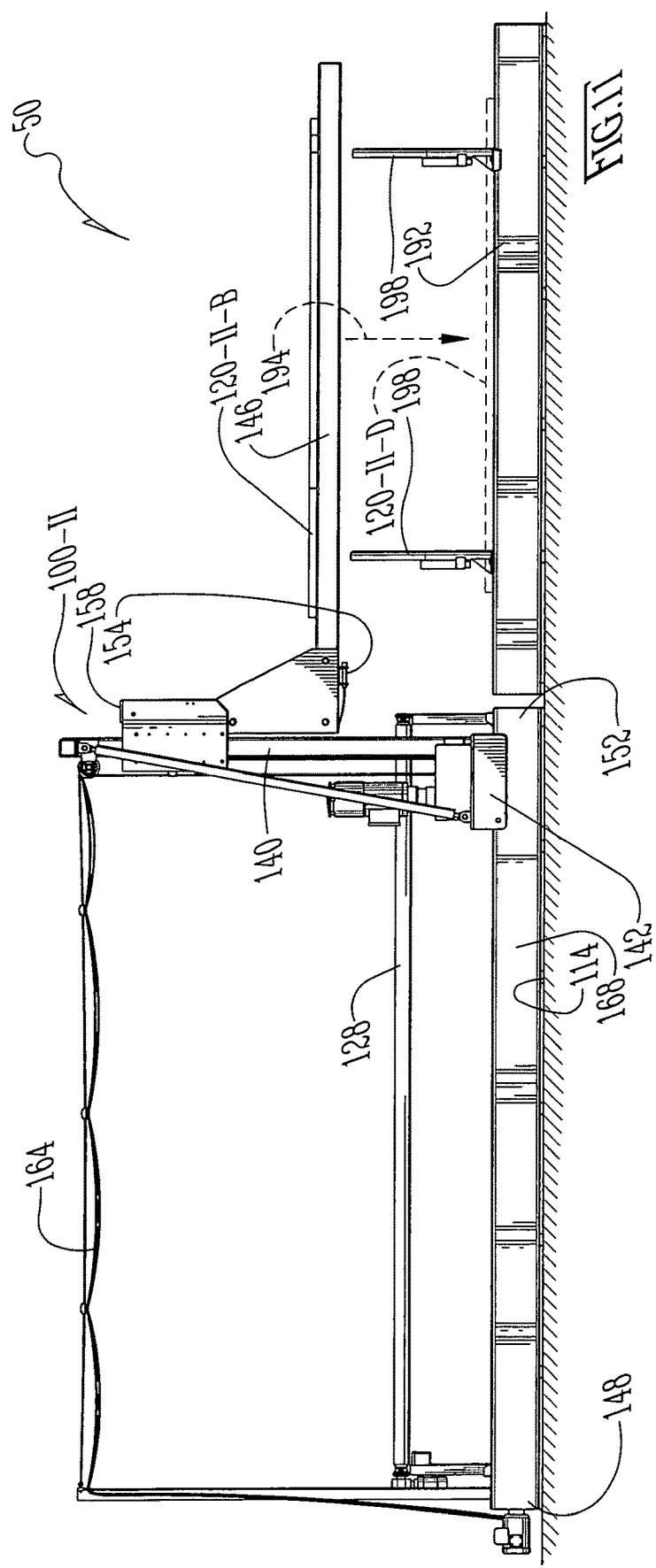
FIG. 11 is a side elevation comparable to FIG. 10 except showing that the pair of masts (only the mast in the foreground of FIG. 11 is discernible) have completed the transit across the rail and track system and support the lifted truss in an elevated position in the airspace above the ground stand-offs of the stack forming sub-station.
Figure 12:
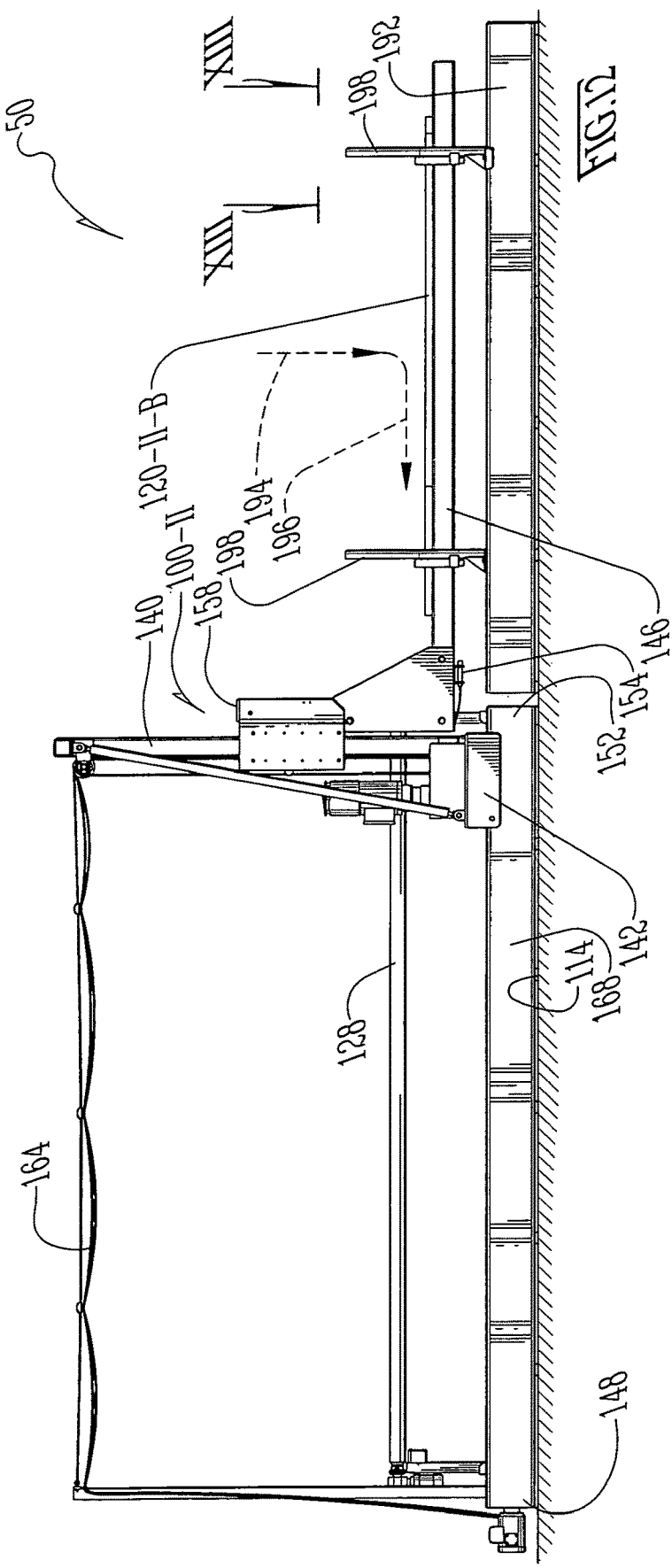
FIG. 12 is a side elevation comparable to FIG. 11 except showing the masts lowering their respective bunks (wherein only the mast and bunk in the foreground of FIG. 12 are discernible) to deposit the truss on top of the ground stand-offs of the stack forming sub-station (but if any earlier trusses were stacked, then the bunks would be depositing the lifted truss on top of the stack)

FIG. 10 shows the masts 140 traveling across the rail and track system 144 therefor to transport the lifted truss 120-II-B to an elevated position over the ground stand-offs 192 of the stack forming sub-station 112. FIG. 11 shows the masts 140 have completed the transit across the rail and track system 144 and support the lifted truss 120-II-B in an elevated position in the airspace above the ground stand-offs 192 of the stack forming sub-station 112. FIG. 12 shows the masts 140 lowering their respective bunks 146 to deposit the truss 120-II-B on top of the ground stand-offs 192 of the stack forming sub-station 112 (but if any earlier trusses 120-I-D, 120-II-C were stacked, then the bunks 146 would be depositing the lifted truss 120-II-B on top of the stack 122).

Figure 13:
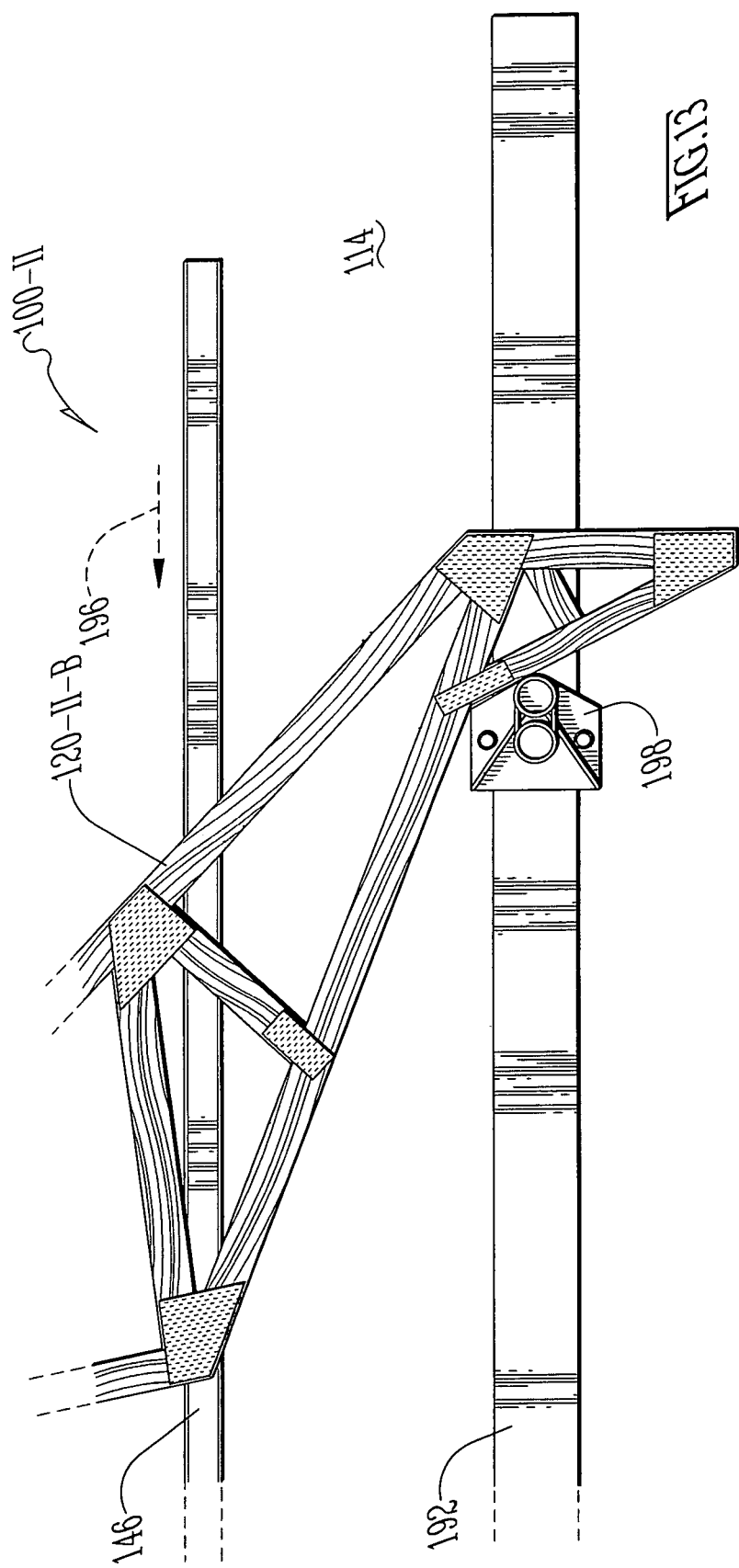
FIG. 13 is an enlarged-scale top plan view taken in the direction of arrows XIII-XIII in FIG. 12 and showing the one bunk in the view in retreat under the lifted truss as the masts return to the home position therefor (masts not shown), wherein a stop post is cooperating in stripping the lifted truss off the bunk.

FIG. 13 is a top plan view taken in the direction of arrows XIII-XIII in FIG. 12. It shows a representative one of the pair of bunks 146 in retreat under the lifted truss 120-II-B as the masts 140 return to the home position 150 therefor. A stop post 198 is cooperating in stripping the lifted truss 120-II-B off the bunk 146.

Figure 14:
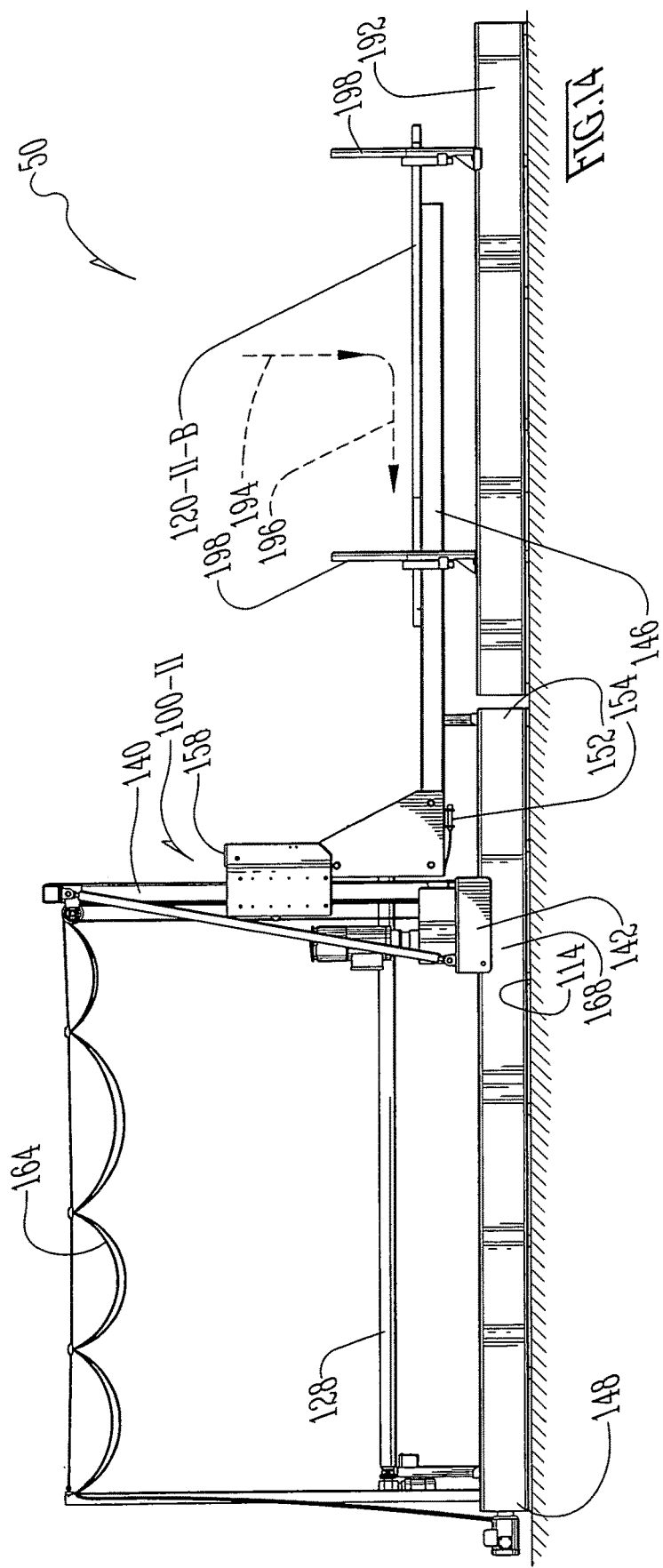
FIG. 14 is a side elevation view that is counterpart to FIG. 13 and showing the pair of masts (only the mast in the foreground of FIG. 13 is discernible) returning back across the rail and track system therefor to return to a home position as well as the stop posts cooperatively stripping the lifted truss off the bunk.
Figure 15:
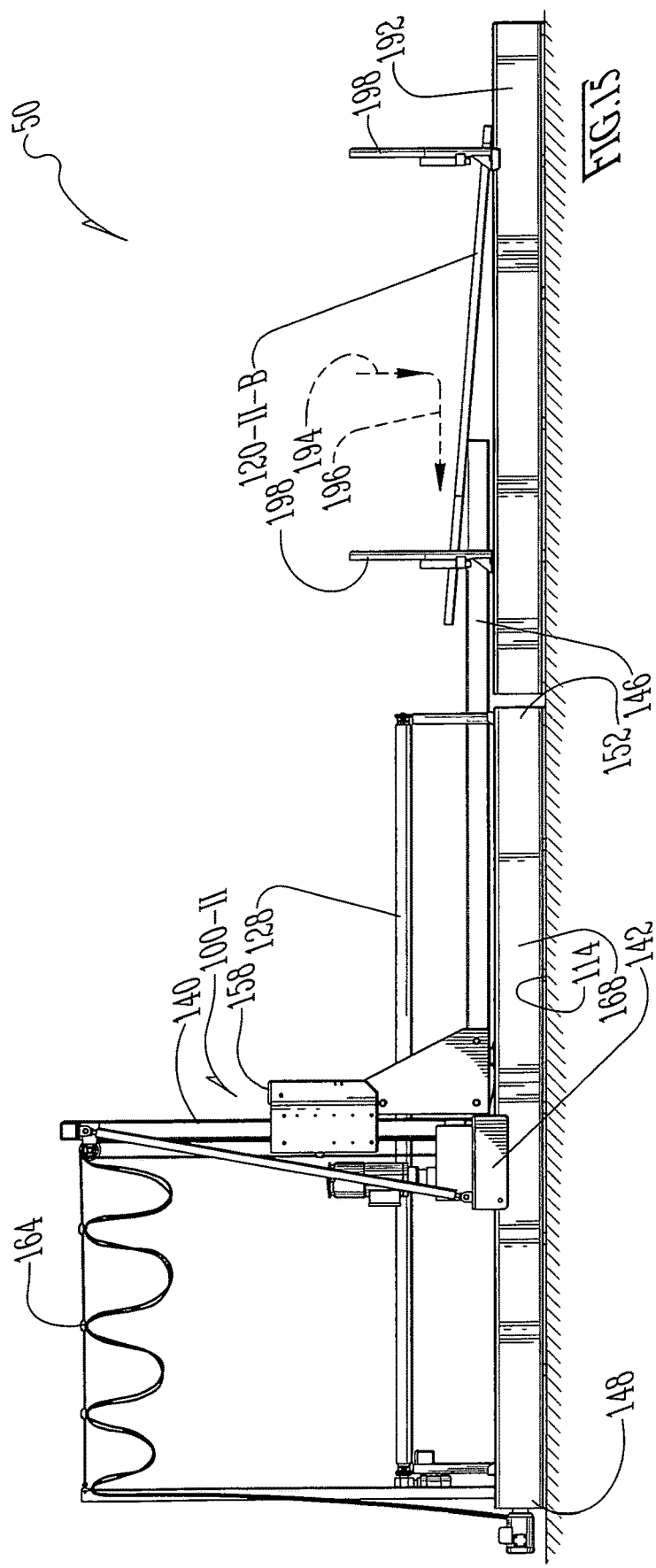
FIG. 15 is a side elevation comparable to FIG. 14 and showing further progress of the pair of masts (only the mast in the foreground of FIG. 15 is discernible) returning back to the home position therefor, and moreover showing further progress of the lifted truss being stripped off the bunks by the truss-stripping stop posts distributed in a pattern for this purpose.
Figure 16:
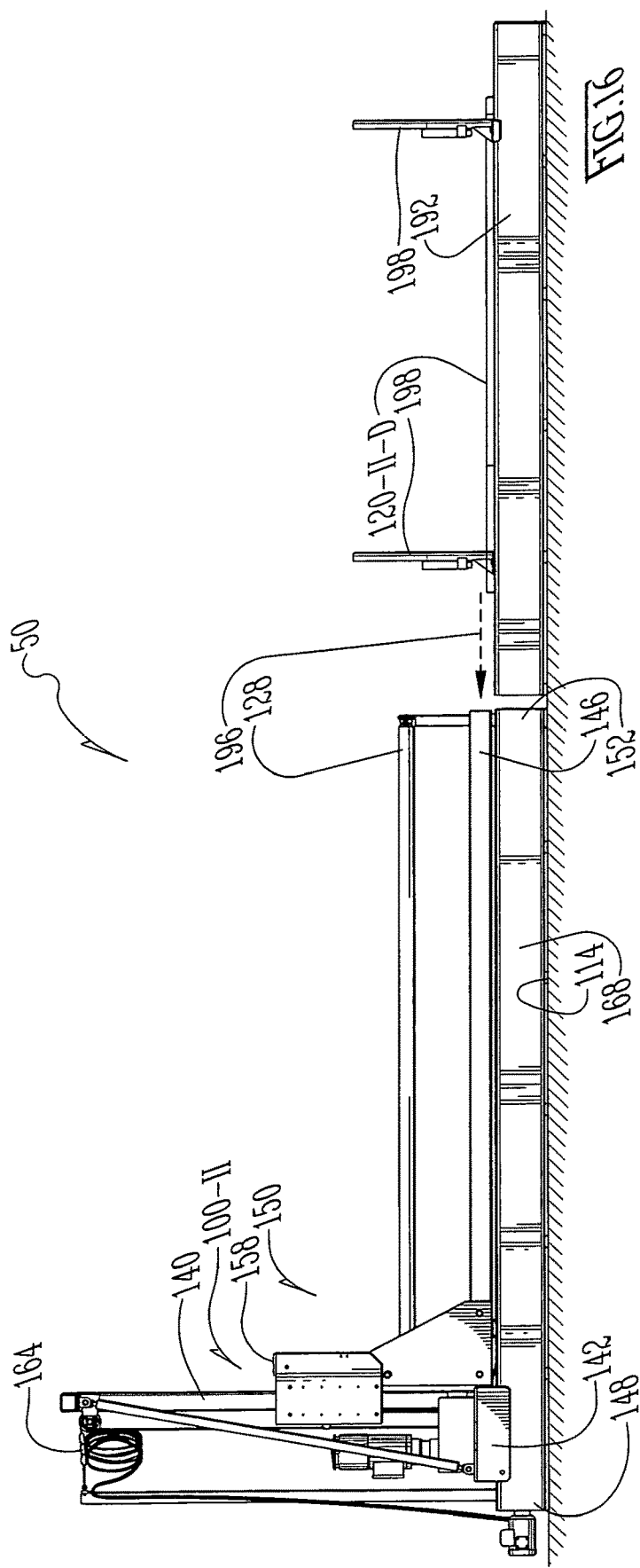
FIG. 16 is a side elevation comparable to FIG. 8 inasmuch as showing that the pair of masts (only the mast in the foreground of FIG. 16 is depicted) have indeed returned back to the home position therefor, which is the same position as in FIG. 8, and moreover showing that the first truss of the stack lies horizontally on the ground stand-offs therefor (and which truss will thereby represent the bottommost truss of this stack)

FIG. 14 returns to being a side elevation view comparable to FIGS. 8-12 and shows the masts 140 returning back across the rail and track system 144 therefor to return to the home position 150. Again, the stop posts 198 are cooperatively stripping the lifted truss 120-II-B off the bunks 146. FIG. 15 shows further progress of the masts 140 returning back to the home position 150 therefor, and moreover showing further progress of the lifted truss 120-II-B being stripped off the bunks 146 by the truss-stripping stop posts 198, which are distributed in a pattern for this purpose. FIG. 16 shows things in a position comparable to FIG. 8 inasmuch as showing that the masts 140 have indeed returned back to the home position 150 therefor, which is the same position as in FIG. 8, and moreover showing that the first truss 120-II-D of the stack 122 lies horizontally on the ground stand-offs 192 therefor (and which truss 120-II-D will thereby represent the bottommost truss 120-II-D of this stack 122).

FIG. 17 shows that the stack 122 now comprises several trusses 120-I-D, 120-II-C stacked horizontally on top of each other. FIG. 12 shows better the detector 154 that is mounted in a plane below the bunks 146 that senses the elevation of the top of the stack 122 such that the masts 140 do not drive the bunks 146 down into the top of the stack 122 when lowering the current lifted truss 120-II-B onto the top of the stack 122. Preferably this detector 154 comprises a laser device 154 and the beam axis 156 therefor is indicated in dashed lines in FIG. 7.

FIG. 17A is block diagram perspective view of the truss stacking system 50 in accordance with the invention showing that the work yard might comprise an indefinite number of sets of lift and stack forming sub-stations 110 and 112. The sets 110 and 112 might not always be pairs. Each set of lift and stack forming sub-stations 110 and 112 might comprise three or more masts 140 and not just two as illustrated.

More significantly as shown in FIG. 17A, each truss stacking station 100-I, 100-II . . . 100-N (whether it be two masts 140 or more) is associated with a detector 200, preferably comprising an identifying and motion detecting function for both 'identifying' if the given truss 120-I-A, 120-II-A . . . is to be selected for lifting by the respective truss lift sub-station 110 and, if so, then also providing a signal for figuring the 'timing' when to lift the truss 120-I-A, 120-II-A . . . as it travels along the outflow conveyor 106. The timing does not have to be perfect. The stop posts 198 are arranged to serve a second function beyond stripping alone. That is, the stop posts 198 are arranged to induce the trusses 120-I-A, 120-II-A . . . to stack in neat stacks 122.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. Truss stacking apparatus comprising:
   at least one truss stacking station; and
   a roller conveyor bed for conveying trusses away from production equipment and through the at least one truss stacking station, the roller conveyor bed defining a transit path and a transit plane;
   the at least one truss stacking station comprises at least two independent truss lift apparatus working in tandem and at least one stack forming sub-station disposed to one side of the transit path of the roller conveyor bed, the at least one stack forming sub-station defining a stack-forming side for the transit path and a home side on the other side of the transit path;
   each truss lift apparatus comprising:
       an elongated rail disposed below the transit plane and generally transverse to the transit path;
       a traveling carriage for traveling back and forth along the rail from a home position proximate the home side of the transit path between outbound trips toward the stack-forming side and inbound trips returning to the home position;
       a carriage-drive system for the carriage;

an elongated generally vertical mast anchored to the carriage;
a vertically traveling bracket for traveling up and down between lowered positions and elevated positions respectively below and above the transit plane;
a bracket-drive system for the bracket; and
an elongated bunk cantilevered from the mounting bracket and extending transverse to the transit plane;
whereby the at least two independent truss lift apparatus work in tandem to lift, transport sideways into the airspace over, and deposit on the stack-forming substation a truss conveying downline on the roller conveyor bed;
wherein the independent truss lift apparatus have a cycle, from a start having the carriage at the home position, comprising:
elevating the bunk from a lowered position to a raised position and thereby, when timed with the transit of a truss, lifting the truss off the transit path of the roller conveyor bed;
driving the carriage on an outbound trip;
lowering the bunk to close the airspace above the stack-forming station and/or a stack of previously stacked trusses;
retreating the carriage on an inbound trip and returning the carriage and mast to the start;
wherein the bracket-drive system travels with the carriage and the carriage's outbound and inbound trips; and
wherein the bracket-drive system comprises an electric-motor driven drive train utilizing any of gear, sprocket, spindle, chain or cable; and
further comprising:
festooned electric conductors supplying the electric-motor driven drive train with power during the outbound and inbound travel of the carriage.

2. The truss stacking apparatus of claim 1, wherein:
each carriage further comprises riding gear traveling along the respective rail; and
the carriage-drive system comprises an electric-motor driven drive train utilizing any of gear, sprocket, spindle, chain or cable.

3. The truss stacking apparatus of claim 2, wherein:
the riding gear comprises any of rollers, wheels, sprocket or spindle.

4. The truss stacking apparatus of claim claim 1, wherein:
each carriage further comprises riding gear traveling along the respective rail; and
the rail comprises the upper flanges of a structural beam.

5. Truss stacking apparatus comprising:
at least one truss stacking station; and
a roller conveyor bed for conveying trusses away from production equipment and through the at least one truss stacking station the roller conveyor bed defining a transit path and a transit plane;
the at least one truss stacking station comprises at least two independent truss lift apparatus working in tandem and at least one stack forming sub-station disposed to one side of the transit path of the roller conveyor bed, the at least one stack forming sub-station defining a stack-forming side for the transit path and a home side on the other side of the transit path;
each truss lift apparatus comprising:
an elongated rail disposed below the transit plane and generally transverse to the transit path;
a traveling carriage for traveling back and forth along the rail from a home position proximate the home side of the transit path between outbound trips toward the stack-forming side and inbound trips returning to the home position;
a carriage-drive system for the carriage;
an elongated generally vertical mast anchored to the carriage;
a vertically traveling bracket for traveling up and down between lowered positions and elevated positions respectively below and above the transit plane;
a bracket-drive system for the bracket; and
an elongated bunk cantilevered from the mounting bracket and extending transverse to the transit plane;
whereby the at least two independent truss lift apparatus work in tandem to lift, transport sideways into the airspace over, and deposit on the stack-forming substation a truss conveying downline on the roller conveyor bed;
wherein the rail comprises a inverted-V shaped, sharp-crested rail; and
each carriage further comprises riding gear traveling along the respective rail comprising at least a pair of V-grooved rail-riding wheels.

6. Truss stacking apparatus comprising:
at least one truss stacking station; and
a conveyor conveying trusses away from production equipment and through the at least one truss stacking station, the conveyor defining a transit path and a transit plane;
the at least one truss stacking station comprises at least two independent truss lift apparatus working in tandem and at least one stack forming sub-station disposed to one side of the transit path of the conveyor, the at least one stack forming sub-station defining a stack-forming side for the transit path and a home side on the other side of the transit path;
each truss lift apparatus comprising:
a traveling carriage for traveling back and forth along the rail from a home position proximate the home side of the transit path between outbound trips toward the stack-forming side and inbound trips returning to the home position;
a carriage-drive system for the carriage;
an elongated generally vertical mast anchored to the carriage;
a vertically traveling bracket for traveling up and down between lowered positions and elevated positions respectively below and above the transit plane;
a bracket-drive system for the bracket; and
an elongated bunk cantilevered from the mounting bracket and extending transverse to the transit plane:
the independent truss lift apparatus have a cycle, from a start having the carriage at the home position, comprising:
elevating the bunk from a lowered position to a raised position and thereby, when timed with the transit of a truss, lifting the truss off the transit path of the conveyor;
driving the carriage on an outbound trip;
lowering the bunk to close the airspace above the stack-forming station and/or a stack of previously stacked trusses;
retreating the carriage on an inbound trip and returning the carriage and mast to the start;
wherein the bracket-drive system travels with the carriage and the carriage's outbound and inbound trips; and
wherein the bracket-drive system comprises an electric-motor driven drive train utilizing any of gear, sprocket, spindle, chain or cable; and
further comprising:

festooned electric conductors supplying the electric-motor driven with power during the outbound and inbound travel of the carriage.

7. The truss stacking apparatus of claim claim 6, wherein: the main conveyor comprises a roller conveyor bed, which comprises a series of spaced hurdles having rollers for cross bars, wherein the rollers cooperatively define the transit path and transit plane, and wherein the rollers are generally parallel to one another and transverse to the transit path.

8. The truss stacking apparatus of claim claim 6, further comprising:
a rail for each carriage for traveling along between outbound and inbound trips.

\* \* \* \* \*